UNITED STATES PATENT OFFICE.

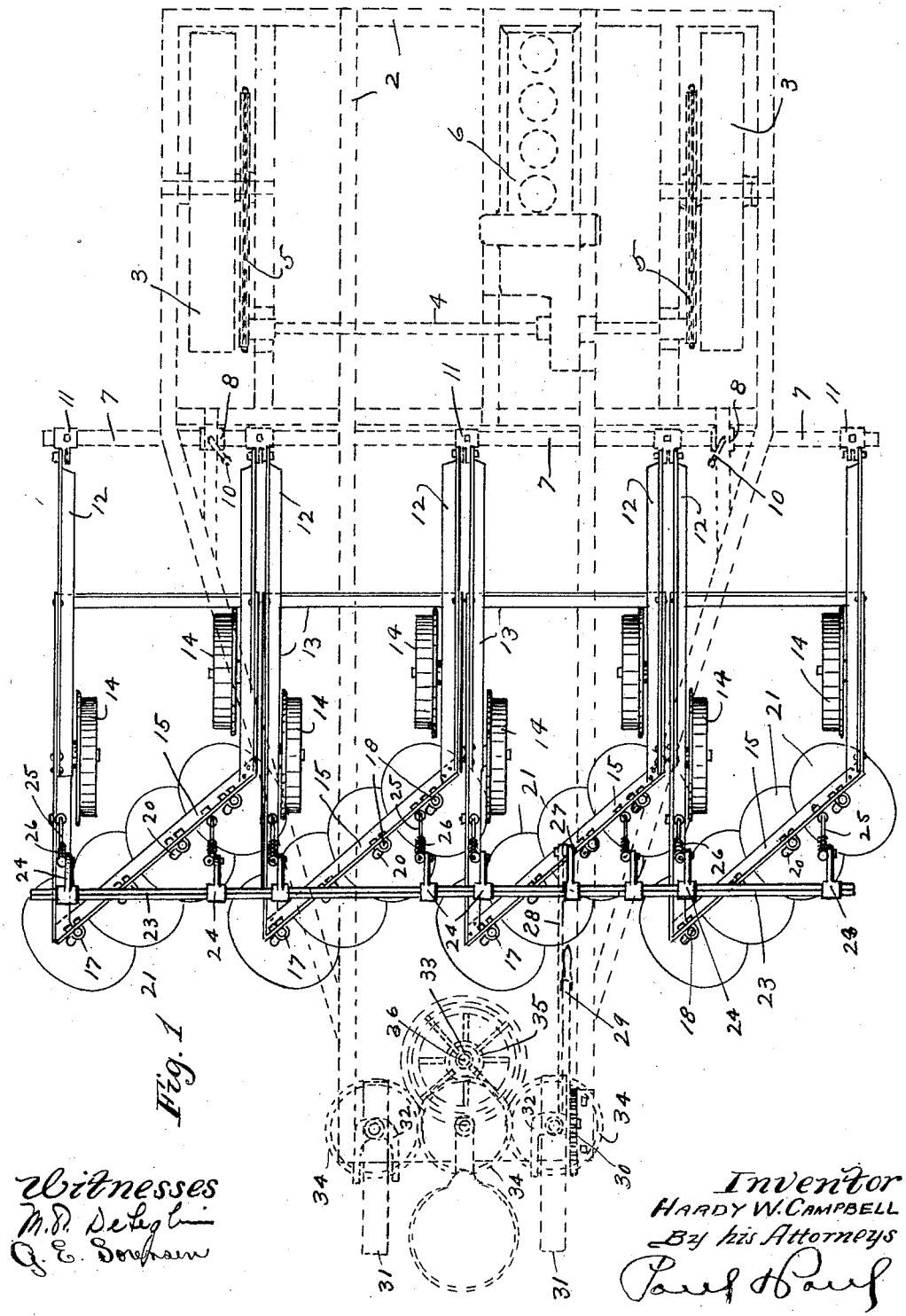

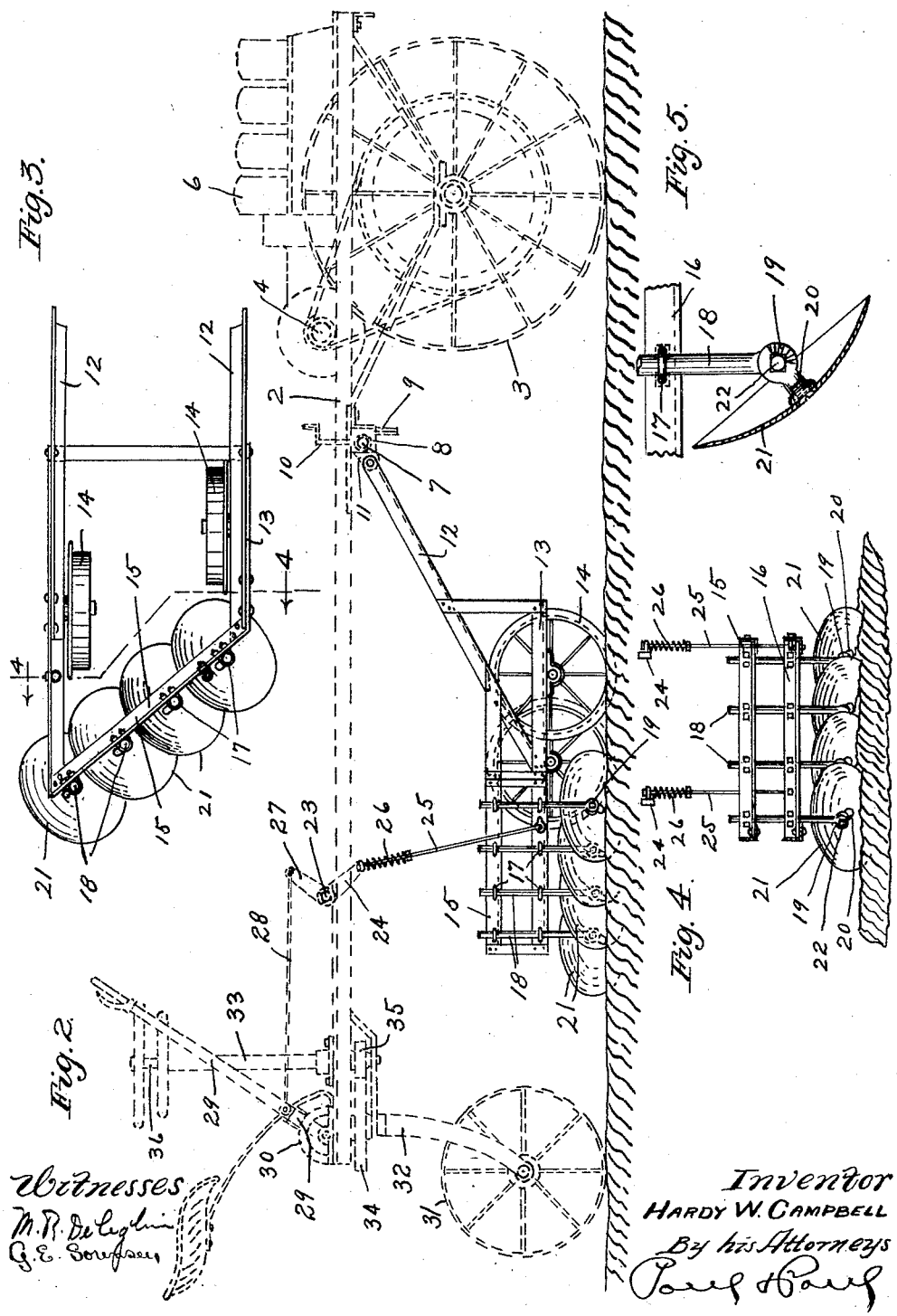

HARDY WEBSTER CAMPBELL, OF OAKLAND, CALIFORNIA.

ROTARY-DISK CULTIVATOR.

1,417,971. Specification of Letters Patent. Patented May 30, 1922.

Application filed October 15, 1918. Serial No. 258,234.

*To all whom it may concern:*

Be it known that I, HARDY W. CAMPBELL, a citizen of the United States, resident of Oakland, county of Alameda, State of California, have invented certain new and useful Improvements in Rotary-Disk Cultivators, of which the following is a specification.

The object of my invention is to provide a disk cultivator by means of which weeds, grass, wild oats and the like may be cut and destroyed, leaving the seed bed intact.

A further object is to provide a machine of light draft and one which will handle effectively a comparatively large number of disks and hence have a large capacity in the sense that it will cover a greater area in a given time than machines for this purpose as usually designed.

A further object is to provide a disk cultivator which, while primarily intended to prepare the soil for seeding, may also be used to cultivate a stubble field immediately following the cutting of a grain crop to conserve the moisture as well as assist cultivation and to destroy wild oats and other weeds that will come from later sowing.

Other objects of the invention will appear from the following detailed description.

The invention consists generally in various constructions and combinations, all as hereinafter described and particularly pointed out in the claims.

In the accompanying drawings forming part of this specification,

Figure 1 is a plan view of a rotary disk cultivator embodying my invention,

Figure 2 is a side elevation of the same,

Figure 3 is a detail view showing the manner of mounting the cultivating disks in their supporting frame, Figure 4 is a sectional view on the line 4—4 of Figure 3, Figure 5 is a detail view showing the means of mounting the die on its supporting stud.

In the drawing, 2 represents the main frame of the machine and 3 traction supporting wheels mounted in bearings in the forward portion of said frame and driven through a shaft 4 and sprocket belts 5 from an internal combustion engine 6 of suitable design mounted on said frame.

Transversely mounted near the middle of said frame is a shaft 7 having bearings in blocks 8 which are vertically adjustable in guides 9 by means of adjusting screws 10. Upon this shaft collars 11 are secured and to these collars drag bars 12 are pivotally connected. By the adjustment of the screws 10 the blocks 8 and the drag bars may be raised or lowered to vary the depth of cut of the revolving disks.

13 represents the frame to which the drag bars 12 are secured, said frame being provided at intervals with wheels 14, preferably flanged, to prevent lateral movement of the frame and disks in the soil. This frame preferably has upper and lower bars 15 and 16 wherein U-bolts 17 are mounted at intervals, said bars being arranged at an angle to the draft line of the machine, as indicated in Figure 3. On these bars I mount by means of the U-bolts a series of upright shanks 18 held firmly by the U-bolts. The lower ends of these shanks have flattened corrugated faces 19 which are seated against similar corrugated faces provided on studs 20 which are centrally mounted in disks 21, the corrugated faces being secured together by suitable means, such as bolts 22. When these bolts are loosened, the disks may be adjusted to vary their angle with respect to the ground line and to their supporting shanks, so that I can adjust these disks for any desired depth of cut and angle with respect to the surface of the soil through which they are moving, and as the rows of disks are at an angle to the direction of movement of the machine, each disk will be forced to revolve as the machine moves along and will completely cut and thoroughly cultivate the top surface to a suitable depth, say two inches, destroying weeds, grass roots, and any plant growth which would take moisture from the soil or interfere with seeding and the growth of the crop. In other words, these disks will completely destroy all weed growth on a summer tilled field, without cutting deep enough to destroy the seed bed, it being, of course, desirable to leave the seed bed firm and undisturbed when the surface plowing has become settled.

I have shown the disks arranged in groups of four disks each and four groups across the machine, but it will be understood that the number of disks in a group may be varied and the number of groups increased or diminished, as desired. The disks are so inclined to the ground line that they will have a drawing action in the soil to thoroughly work up and cultivate the top surface while leaving the under soil or seed bed smooth, firm and intact, ready for the deposit of the seed therein.

Upon the frame of the machine I mount a shaft 23 provided with crank-arms 24 pivotally connected by a rod 25 with the frame 13, said rod being free to slide in said crank arm and yieldingly held against such movement by a spring 26. A crank 27 is mounted on the shaft 22 and connected by a rod 28 with a lever 29 that is movable over a quadrant 30. By means of this lever the operator of the machine can raise the disks out of the soil when desired or drop them down for action by the rocking of the shaft 23 and the downward movement of the arms 24.

The rear portion of the machine has supporting wheels 31 arranged in parallel relation on forks 32 which are journaled in the frame of the machine and operatively connected with a steering post 33 by means of gears 34 and a pinion 35. This guiding mechanism corresponds to that shown and described in a companion application for a traction machine filed of even date herewith. When the post 33 is rotated the wheel 31 will be rocked on a vertical axis to change the direction of movement of the machine, as described in my application referred to. I have also shown a part 36, concentric with the post 33, on which a cable (not shown) may be wound for shifting the shaft 7 laterally with respect to the machine. This is a feature of my tractor application mentioned above that will not be necessary in connection with this machine when it is used for preparing the ground for seeding purposes but may be utilized if the disks are mounted with spaces between the groups to adapt the machine for cultivating between the rows of plants. Generally, however, this frame 13 with the disks mounted therein will be used as shown in the drawing for preparing the seed bed and will be removed from the traction machine and the cultivating plows substituted therefor when cultivation between the rows of plants is desired.

I claim as my invention:

1. The combination, with a frame having carrying wheels, of a supplemental frame having a drag bar connection with said wheel frame, shanks mounted in said supplemental frame, concavo-convex disks mounted on said shanks for adjustment thereon upon an axis transverse substantially to the longitudinal axis of said shanks and said disks being mounted with their convex faces on the underside to rest upon the soil in the rear of the forward cutting edges of said disks, and said disks being arranged obliquely to the draft line of the machine.

2. A rotary disk cultivator comprising a frame, a series of disks mounted therein, each disk being mounted for adjustment on an axis transverse to the disk, said disks having convex surfaces for contact with the soil in the rear of their cutting edges, and said disks being mounted obliquely in said frame to be revolved by such contact.

3. A rotary disk cultivator comprising a supporting frame, shanks mounted therein, disks mounted on the lower ends of said shanks for adjustment thereon with respect to the longitudinal axis of said shanks to vary the angle having a convex under surface to rest upon the soil and a forward cutting edge for of said disks with respect to the ground line, said disks making only a shallow cut in the soil and destroying the weed and grass roots and cultivating the surface soil, leaving the firmer lower soil intact for a seed bed.

4. The combination, with a frame having carrying and guiding wheels, of a supplemental frame having drag bar connections with said wheeled frame, a series of disks mounted obliquely in said supplemental frame and revolving at an acute angle to the ground line and imparting a lateral thrust to said supplemental frame, and flanged wheels mounted in said supplemental frame for resisting such lateral thrust.

5. A machine for cultivating the top soil and cutting weeds comprising a frame, a row of disks mounted transversely in said frame at an angle to its direction of movement, each disk being independently supported and having a convex under surface and a forward cutting edge, the support for each disk permitting its adjustment to vary the angle of its forward cutting edge to the ground line, said forward cutting edge loosening the top soil to form a mulch, its depth of cut being regulated by its angle of adjustment to the ground line and said disks when at work having their convex under surfaces in contact with the soil in the rear and adjacent their forward cutting edges.

In witness whereof, I have hereunto set my hand this 25" day of July, 1918.

HARDY WEBSTER CAMPBELL.